Nov. 21, 1950  W. E. HUNT  2,530,467
VIBRATION DAMPENING DRIVE SYSTEM FOR AIRCRAFT
Filed Feb. 11, 1947  2 Sheets—Sheet 1
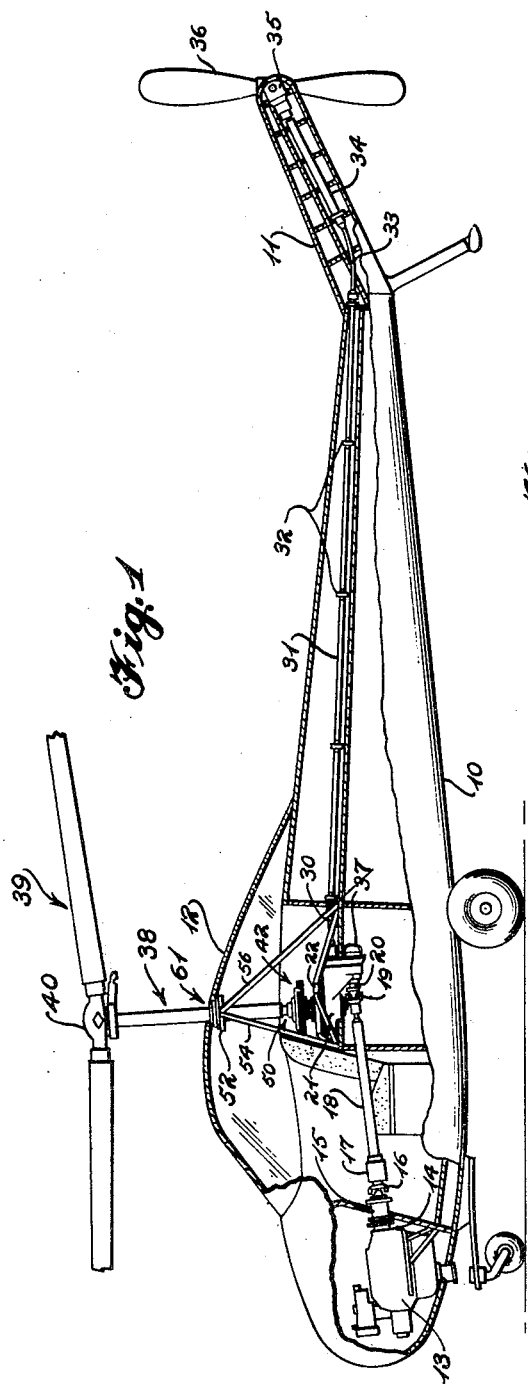
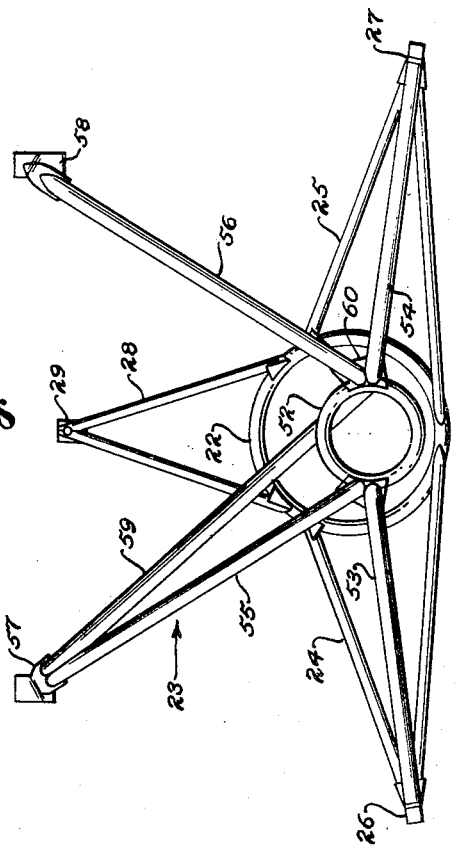
William E. Hunt, Inventor

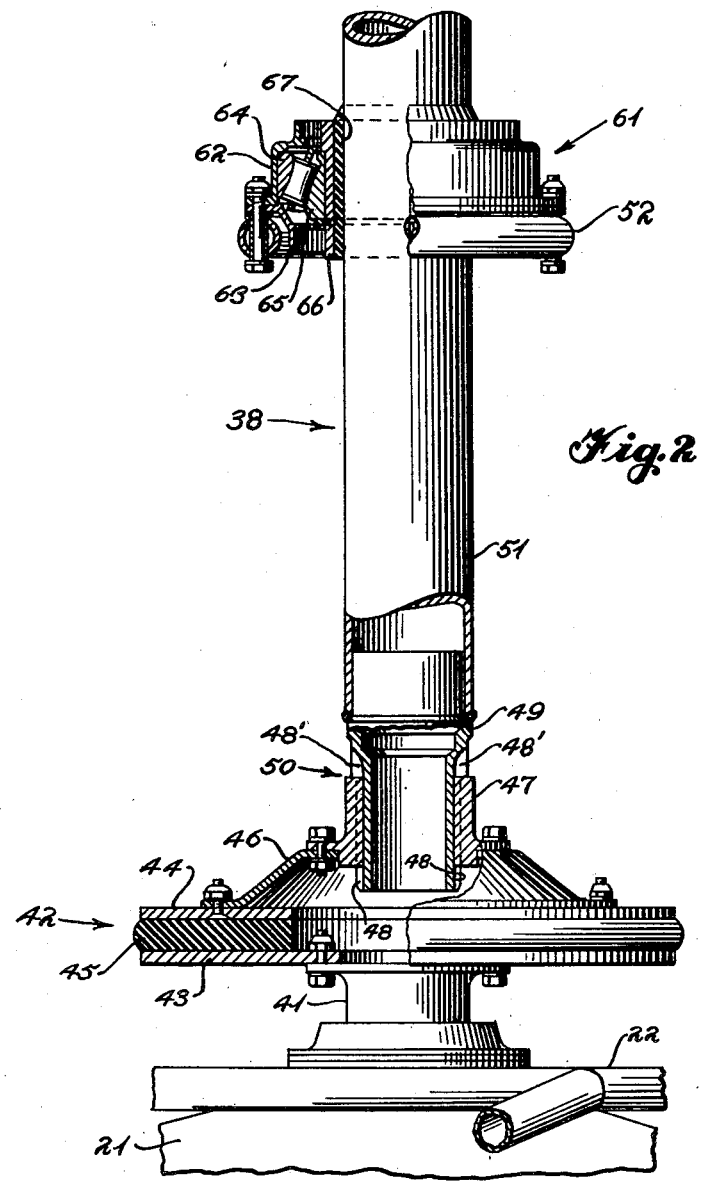

Patented Nov. 21, 1950

2,530,467

UNITED STATES PATENT OFFICE 2,530,467

VIBRATION DAMPENING DRIVE SYSTEM FOR AIRCRAFT

William E. Hunt, Brooklyn, Conn.

Application February 11, 1947, Serial No. 727,749

11 Claims. (Cl. 64—1)

This invention relates to drive system for aircraft and has as its principal object to provide dampening means whereby a drive shaft and the air screw, i. e., propeller or lifting rotor, driven thereby, are substantially isolated from the rest of the craft. In the drawings, the invention is shown embodied in a helicopter.

Figure 1 being a side elevation of the helicopter, partly broken away,

Figure 2 an enlarged partial elevation of the rotor drive shaft, partly broken away, and Figure 3 an enlarged plan view of a frame unit.

In Figure 1, there is shown a two place helicopter comprising a fuselage 10 having an upwardly and rearwardly inclined tail portion 11 and a forward cabin with a faired roof 12, the body being equipped with a nose wheel, main wheels and a tail skid, as here shown. Reference numeral 13 designates an engine mounted in the nose of the body and having a drive flange 14 which through a free wheeling unit 15, universal joint 16, rubber coupling 17, shaft 18 which passes between the seats, and universal joint 19, drives the input shaft 20 of a gear box 21 which is secured beneath the annular lower member 22 of a frame unit 23, see also Figure 3. Member 22 is supported by laterally extending pairs of struts 24 and 25 whose convergent ends are fixed to anchor brackets 26 and 27 on the body. Member 22 is further supported by a rearwardly extending pair of struts 28 whose convergent ends are fixed to an anchor bracket 29 on the body. The strut members incline somewhat up to member 22.

A flexible shaft portion 30 in connection with a power take off at the rear of the gear box drives a rearwardly extending shaft 31 mounted in rubber cushioned bearings 32, shaft 31 through flexible shafting 33 driving a shaft 34 which goes to the tail rotor transmission box 35. The latter has an output shaft on which the tail rotor 36, whose pitch is adjustable or whose speed is variable, is mounted. Reference numeral 37 designates an oil pump on gear box 21 which provides pressure for the controls, not shown.

Reference numeral 38 designates the main drive shaft which rises from the gear box and through an opening in the roof and has associated therewith a rotor 39 through a hub 40 preferably of the type shown in my copending application Serial No. 690,511, filed August 14, 1946.

The main drive shaft, Figure 2, comprises a lower portion 41 whose lower end is fixed to a gear, not shown, mounted in the gear box for rotation on an upright axis and maintained against axial displacement. Surmounting shaft portion 41 is a rubber coupling 42 which comprises lower and upper discs 43 and 44 between which is bonded, preferably by molding, a rubber annulus 45 which is yieldable in a plane transversely of the shaft axis, that is, substantially horizontally. Disc 43 is bolted to a top flange of shaft section 41. Bolted to the top of disc 44 is an annular bowl shaped member 46 to which is bolted, coaxially with shaft portion 41, a collar 47 provided internally with axially extending grooves slidably engaged by the splines 48 of a tubular fitting 49 to provide a telescoping torque transmitting coupling generally designated by reference numeral 50. Fitting 49 is fixed in the lower end of the upper tubular shaft portion 51.

Shaft portion 51 extends through an upper annular member 52 of the frame 23, member 52 being of substantially smaller diameter than the bottom member 22, as clearly seen in Figure 3, and being located just under the cabin roof. Member 52 is supported by struts 53 and 54 which extend from brackets 26 and 27, by struts 55 and 56 which extend from brackets 57 and 58, and by a strut 59 which extends from bracket 57 and is secured to the ear 60 to which struts 54 and 56 are secured.

Reference numeral 61 designates a thrust bearing including upper and lower flanged housing portions 62 and 63 bolted on frame member 52. Fixed in housing portion 62 is the other race 64 of a self-aligning roller bearing assembly whose inner race 65 is secured to an inner rotary sleeve or ring member 66 having an internal diameter substantially greater than the diameter of the outer shaft portion 51, said shaft portion extending through the ring member. Between the shaft and ring member and bonded to both is a rubber bushing 67 which, desirably, is molded in place, care being taken to maintain the concentricity of the bonded members. The rubber bushing is of the yieldable type of rubber ordinarily used in rubber couplings. The rubber in this bushing can be either of the natural or synthetic type and its softness or durometer reading is such that the main rotor shaft 38 to which it is bonded is allowed considerable vertical freedom of movement. In the present example, shaft portion 51 has a diameter of 3 inches, the bushing has a wall thickness of $\tfrac{1}{16}$ of an inch, and the bonded areas are about 3 inches in axial extent, providing a vertical movement of the drive shaft upwards to ½" depending on the shock load and/or degree of dampening found necessary.

It will be evident that when the helicopter is in the air, the entire weight of the body is supported by the upper strut system and the thrust bearing through bushing 67. The splines 48 are shown in Figure 2 as having top shoulders 48' which may rest on top of collar 47 to relieve the bushing of the weight of the rotor when the craft is idle on the ground. Under lift, however, the stop shoulders move somewhat away from the collar by reason of the upward deflection of the bushing. The amount of upward deflection depends mainly on two factors, namely, the R. P. M. of the rotating shaft and the weight suspended.

The rubber bushing is a dampener of vertical excitations, more specifically those in a helicopter caused by the variation of lift across the rotor wings due to the advance and retreat of the wings. The amount of dampening is directly proportional to the amount of deflection allowed in the rubber bushing for a given weight and R. P. M. A certain amount of radial deflection allows for deflection due to bending in the drive shaft. However, the principal function of the bushing is the isolation of the rotor from the rest of the craft as regards vertical excitations.

The main lifting rotor of a helicopter when in motion is any direction is subject to coriolis forces. In the present case, these forces associated with the second harmonic cause a chordwise or horizontal excitation which is dampened by the horizontal rubber coupling 42. This coupling takes no vertical loads, only radial loads. The amount of dampening depends upon the amount of deflection and torque absorbed with respect to the R. P. M. Also, when starting or stopping the main rotor, the rubber coupling 42 acts as a cushion between the transmission and the rotor shaft.

The rubber coupling 17 dampens out the high frequency vibration between the engine and transmission.

While the described embodiment is, in all respects, that at present preferred, it will be understood that variations in the form and arrangement of parts are possible and are contemplated under the invention as defined in the following claims.

I claim:

1. A vibration dampening drive mechanism comprising a rotary drive shaft including inner and outer portions and a telescoping coupling therebetween, a thrust bearing concentrically enclosing said outer shaft portion and rigidly supported with respect to said inner shaft portion, and a yielding rubber bushing between said thrust bearing and said outer shaft portion and bonded to both.

2. Mechanism according to claim 1 wherein a transversely yieldable coupling is interposed between said inner shaft portion and said telescoping coupling.

3. An axial vibration dampening drive mechanism adapted for use with air screws, comprising a rotary drive shaft including inner and outer portions and a telescoping coupling therebetween, a self-aligning thrust bearing concentrically enclosing said outer shaft portion and rigidly supported with respect to said inner shaft portion, and a yielding rubber bushing between said thrust bearing and said outer shaft portion and bonded to both.

4. Mechanism according to claim 3 wherein a transversely yieldable coupling is interposed between said inner shaft portion and said telescoping coupling.

5. An axial vibration dampening drive mechanism adapted for use with helicopter rotors, comprising a rotary drive shaft including inner and outer portions and a telescoping coupling therebetween, a self-aligning thrust bearing concentrically enclosing said outer shaft portion and rigidly supported in coaxial relationship with respect to said inner shaft portion, said thrust bearing including an inner rotary ring member, and a yielding rubber bushing between said ring member and said outer shaft portion and bonded to both.

6. Mechanism according to claim 5 wherein a transversely yieldable coupling is interposed between said inner shaft portion and said telescoping coupling.

7. A vibration dampening drive mechanism comprising a gear box, a rotary drive shaft extending from said gear box and including inner and outer portions and a telescoping coupling therebetween, a thrust bearing concentrically enclosing said outer shaft portion and rigidly supported with respect to said gear box, and a yielding rubber bushing between said thrust bearing and said outer shaft portion and bonded to both.

8. A vibration dampening drive mechanism comprising a frame unit, a gear box supported by said frame unit, a rotary drive shaft extending from said gear box and including inner and outer portions and a telescoping coupling therebetween, a thrust bearing concentrically enclosing said outer drive shaft and rigidly supported by said frame unit, and a yielding rubber bushing between said thrust bearing and said outer shaft portion and bonded to both.

9. Mechanism according to claim 8 wherein a transversely yieldable coupling is interposed between said inner shaft portion and said telescoping coupling.

10. A vibration dampening mechanism for driving helicopter rotors, comprising a frame unit, a gear box supported by said frame unit, a rotary drive shaft extending upwardly from said gear box and including inner and outer portions and a telescoping coupling therebetween, a self-aligning thrust bearing concentrically enclosing said outer shaft portion and rigidly supported by said frame unit, said thrust bearing including an inner rotary ring member, a yielding rubber bushing between said ring member and said outer shaft portion and bonded to both, and a horizontally yieldable coupling interposed between said inner shaft portion and said telescoping coupling.

11. Mechanism according to claim 10 including means limiting the downward movement of said outer shaft portion, whereby said bushing is relieved from carrying the entire weight of said outer shaft portion and mechanism driven thereby when the latter is at rest.

WILLIAM E. HUNT.

REFERENCES CITED

The following references are of record in the file of this patent:

UNITED STATES PATENTS

| Number | Name | Date |
| --- | --- | --- |
| 2,154,991 | Padgett | Apr. 18, 1939 |
| 2,297,400 | Friedrich | Sept. 29, 1942 |
| 2,305,454 | Nallinger et al. | Dec. 15, 1942 |

FOREIGN PATENTS

| Number | Country | Date |
| --- | --- | --- |
| 459,105 | Great Britain | 1937 |